United States Patent
Suciu

(10) Patent No.: US 9,127,741 B2
(45) Date of Patent: Sep. 8, 2015

(54) COLLOIDAL DAMPER

(75) Inventor: Claudiu Valentin Suciu, Fukuoka (JP)

(73) Assignee: FUKUOKA INSTITUTE OF TECHNOLOGY, Fukuoka (JP)

( * ) Notice: Subject to any disclaimer, the term of this patent is extended or adjusted under 35 U.S.C. 154(b) by 57 days.

(21) Appl. No.: 14/009,391

(22) PCT Filed: Mar. 1, 2012

(86) PCT No.: PCT/JP2012/055171
§ 371 (c)(1),
(2), (4) Date: Oct. 2, 2013

(87) PCT Pub. No.: WO2012/137565
PCT Pub. Date: Oct. 11, 2012

(65) Prior Publication Data
US 2014/0020993 A1    Jan. 23, 2014

(30) Foreign Application Priority Data

Apr. 7, 2011   (JP) ................................. 2011-085608

(51) Int. Cl.
| | |
|---|---|
| *F16F 9/53* | (2006.01) |
| *F16F 9/30* | (2006.01) |
| *F16F 9/00* | (2006.01) |

(52) U.S. Cl.
CPC ................ *F16F 9/303* (2013.01); *F16F 9/003* (2013.01)

(58) Field of Classification Search
CPC ...... F16F 9/003; F16F 9/303; F16F 2224/048
USPC ....................... 188/266.7, 268, 269
See application file for complete search history.

(56) References Cited

U.S. PATENT DOCUMENTS

| | | | |
|---|---|---|---|
| 6,768,246 B2 * | 7/2004 | Pelrine et al. ................. 310/339 |
| 2003/0010587 A1 * | 1/2003 | Eroshenko ..................... 188/314 |
| 2004/0173422 A1 * | 9/2004 | Deshmukh et al. ........ 188/267.2 |
| 2009/0243428 A1 | 10/2009 | Qiao | |
| 2010/0059021 A1 | 3/2010 | Rau et al. | |
| 2010/0230876 A1 | 9/2010 | Inoue et al. | |
| 2010/0244457 A1 * | 9/2010 | Bhat et al. ..................... 290/1 A |

(Continued)

FOREIGN PATENT DOCUMENTS

| | | |
|---|---|---|
| JP | 4-19435 | 1/1992 |
| JP | 04019435 A * | 1/1992 |

(Continued)

OTHER PUBLICATIONS

International Search Report (ISR) issued May 22, 2012 in International (PCT) Application No. PCT/JP2012/055171.

*Primary Examiner* — Thomas J Williams
(74) *Attorney, Agent, or Firm* — Wenderoth, Lind & Ponack, L.L.P

(57) ABSTRACT

Provided is a colloidal damper capable of harvesting electrical energy—that is, practical electrical power—from mechanical energy acting from the outside. This colloidal damper has: a cylinder; a piston which is guided and supported so as to reciprocate freely within this cylinder, and which combines with the cylinder to form a sealed space; a porous body having many pores and housed within the sealed space; an operating fluid which is housed together with the porous body in the sealed space and flows into the pores of the porous body when pressure is applied, and flows out from the pores of the porous body when the pressure is reduced; and a piezoelectric element installed in the sealed space.

5 Claims, 13 Drawing Sheets

(56) References Cited

U.S. PATENT DOCUMENTS

| | | |
|---|---|---|
| 2010/0294853 A1 | 11/2010 | Okamura |
| 2011/0234048 A1* | 9/2011 | Toda ............................... 310/322 |
| 2012/0186923 A1* | 7/2012 | Buma ........................... 188/268 |
| 2013/0161957 A1* | 6/2013 | Bhat et al. ....................... 290/53 |

FOREIGN PATENT DOCUMENTS

| | | |
|---|---|---|
| JP | 2004-44732 | 2/2004 |
| JP | 2005-121091 | 5/2005 |
| JP | 2005-121092 | 5/2005 |
| JP | 2006-118571 | 5/2006 |
| JP | 4359901 | 11/2009 |
| JP | 2010-185577 | 8/2010 |
| WO | 96/18040 | 6/1996 |
| WO | 01/55616 | 8/2001 |
| WO | 2008/029501 | 3/2008 |
| WO | 2008/152776 | 12/2008 |

\* cited by examiner

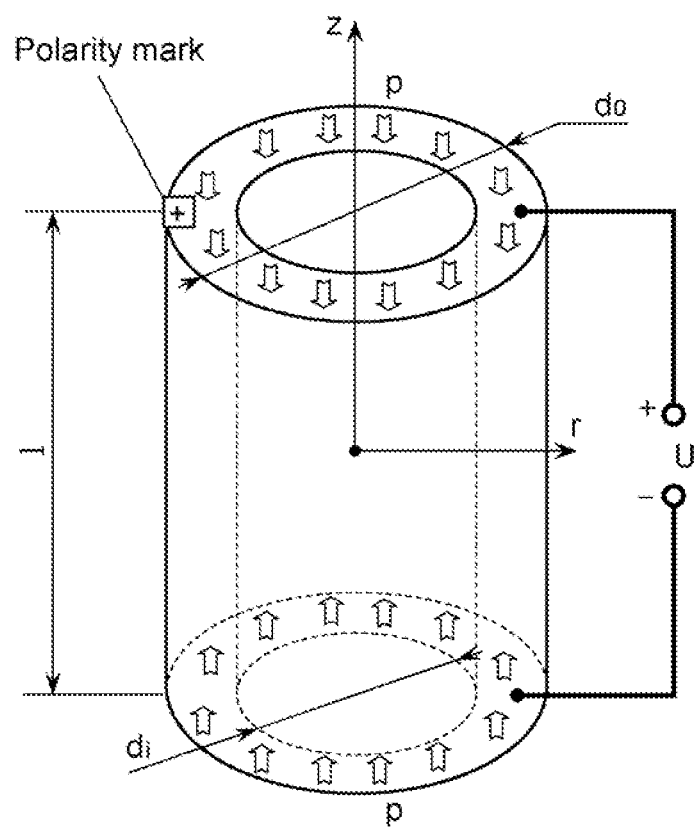

COLLOIDAL DAMPER

CROSS-REFERENCE TO RELATED APPLICATION

The present application is based on the International Application No. PCT/JP2012/055171 which was filed on Mar. 1, 2012 and claims priority under 35 U.S.C. §119 from Japanese Patent Application No. 2011-085608 which was filed on Apr. 7, 2011.

BACKGROUND OF THE INVENTION

1. Field of the Invention

This invention is related to a colloidal damper which accommodates into a closed space a mixture of a working liquid and a porous body such as silica gel, and allows the working liquid to flow-into the pores of the porous body and to flow-out from the pores of the porous body in order to dissipate the externally exerted mechanical energy, and more particularly, to a colloidal damper able to convert the externally exerted mechanical energy into electrical energy.

2. Description of the Related Art

A colloidal damper is a device which accommodates into a closed space a mixture (colloidal solution) of a working liquid and a porous body such as silica gel, and allows the working liquid to flow-into the pores of the porous body and to flow-out from the pores of the porous body in order to dissipate the externally exerted mechanical energy (see, for instance, the Patent References 1 and 2). In order to use such a colloidal damper in practical applications, previously the inventor proposed a colloidal damper able to dissipate the energy of positive damping forces (see, for instance, the Patent Reference 3), as well as a colloidal damper able to dissipate the energy of both positive and negative damping forces (see, for instance, the Patent Reference 4).

Additionally, in order to use such a colloidal damper in practical applications, the inventor proposed a colloidal damper that employs as working liquid a mixture consisted of water and antifreeze agent (see, for instance, the Patent References 5 and 9), a colloidal damper that employs as porous body, such as silica gel, a hydrophobized porous silica gel (see, for instance, the Patent Reference 6), and a colloidal damper with enhanced durability achievable by preventing the leak-out from the closed space of both the porous body and the working liquid (see, for instance, the Patent Reference 7).

Note that a passive-control colloidal damper has a constant damping characteristic (see, for instance, the Patent References 1 to 7). However, in order to efficiently dissipate the energy of vibration and/or shock caused by an external excitation (for example, the displacement excitation by the road roughness in the case of a vehicle suspension, the excitation force of an earthquake in the case of an anti-seismic system, etc.), it is necessary to adjust (control) the damping characteristic of a damper. Accordingly, the inventor proposed an active-control colloidal damper which allows the control of its damping characteristic (see, for instance, the Patent Reference 8).

By the way, fuel injection systems for injecting diesel fuel or gasoline fuel into the intake manifold or directly into the combustion chamber of an internal combustion engine are proposed in the related art (see, for instance, the Patent References 10 and 11). As illustrated in FIG. 12, such a fuel injection system 20 includes a piezoelectric actuator 21 and a controller 22. The trigger voltage "U" of the piezoelectric actuator 21 is adjusted by the controller 22 in order to control the length of the piezoelectric actuator 21, and in this way, it becomes possible to open or to close the fuel injection system 20. Concerning the fuel injection system 20, there is a correlation between the trigger voltage and the fuel pressure. For instance, if the fuel pressure varies in a higher pressure range, typically, in the range of 150 to 170 MPa, the trigger voltage has to be adjusted in the range of 220 to 260 V. Oppositely, if the fuel pressure varies in a lower pressure range, typically, in the range of 30 to 55 MPa, the trigger voltage has to be adjusted in the range of 50 to 80 V (see the Patent Reference 11).

As above-mentioned, recently even in the case of internal combustion engines it is essential to supply from an external source the electrical energy necessary for control. On the other hand, hybrid vehicles which employ both an internal combustion engine (a gasoline engine) and an electric motor have come into wide use recently. FIG. 13 presents the energetic flowchart of a hybrid vehicle. The hybrid vehicle illustrated in FIG. 13 employs a hybrid battery (NiMH) that has an electrical power of 21 kW, a DC (direct current) voltage of 288 V or 202 V, and an electrical energy of 1.8 kWh or 1.3 kWh. Consequently, in the case of this hybrid vehicle its battery provides a current of about 6.3 Ah. Electrical power is transmitted between the generator and inverter, and also between the electric motor and inverter at an AC (alternating current) voltage of 274 V or 500 V. Thus, recently the number of vehicles requiring larger amounts of electrical power is increasing, and hence, it is essential to harvest electrical energy, and to use it without wastes.

Accordingly, systems able to harvest electrical energy from the vehicle suspensions are known in the related art (see, for instance, the Patent Reference 12). Such vehicle suspension employs a structure consisted of an electromagnetic actuator mounted in parallel with a spring. Concretely, the electromagnetic actuator is consisted of a DC electric motor and a generator, and the spring can be, for example, an air spring (see FIG. 14) or a compression helical spring (see FIG. 15). In the case of this vehicle suspension, the shaft of the electromagnetic actuator is connected to a ball-screw rod, and in this way, while the ball-screw rod has a rotational movement, its counterpart, namely, the ball-screw rod has a translational movement.

Accordingly, the above-mentioned ball-screw mechanism is able to transform the up-down (bound-rebound) translational movement of a vehicle, caused by the road roughness, into the rotational movement of the shaft of the electromagnetic actuator. As a result, during a certain operation mode of the vehicle suspension, the electromagnetic actuator provides a positive damping force in response to the bound-rebound movement, and in this way, a damping effect can be obtained. Oppositely, during a different operation mode of the vehicle suspension, the electromagnetic actuator converts the mechanical energy of the bound-rebound movement into electrical energy. In other words, the electromagnetic actuator provides a negative damping force, and in this way, a generation effect can be obtained. The harvested electrical energy can be used to charge/recharge a battery. Moreover, in the above-mentioned system a controller is employed to control the operation modes of the electromagnetic actuator, the charging/discharging of the battery, etc.

Next, the ion separation effect is known as one of conventional processes to convert the mechanical energy into electrical energy. Various principles can be used in order to obtain the ion separation effect. As one of them, for instance, the Patent Reference 13 suggests a system in which a mixture of a nano-porous material and a liquid electrolyte is used. In this system, the liquid electrolyte is forced to penetrate a nanoporous material under the mechanical loading (energy) of vibration and/or shock. The ion separation effect can be obtained by selecting the diameters of nano-pores under the condition that small ions can be absorbed into pores, but large ions cannot be absorbed into pores. As a result, while the liquid absorbed into the nano-pores has an excess of small ions, the bulk liquid, namely, the liquid not absorbed into the nano-pores has an excess of large ions. By collecting the charge difference (voltage) through an electrode with a large surface area, it is possible to convert into electrical energy a part of the mechanical work of the liquid forced to penetrate the nanoporous material.

PRIOR ART REFERENCES

Patent References

Patent Reference 1: International Publication 96/18040
Patent Reference 2: International Publication 01/55616
Patent Reference 3: Japanese Patent Application Publication No. 2004-44732
Patent Reference 4: Japanese Patent Application Publication No. 2005-121091
Patent Reference 5: Japanese Patent Application Publication No. 2005-121092
Patent Reference 6: Japanese Patent Application Publication No. 2006-118571
Patent Reference 7: International Publication 2008/029501
Patent Reference 8: International Publication 2008/152776
Patent Reference 9: Japanese Patent Application Publication No. 2010-185577
Patent Reference 10: U.S. Patent Application Publication No. 2010/059021
Patent Reference 11: U.S. Patent Application Publication No. 2010/294853
Patent Reference 12: U.S. Patent Application Publication No. 2010/230876
Patent Reference 13: U.S. Patent Application Publication No. 2009/243428

However, since the suspension assembly proposed by the Patent Reference 12 to harvest the electrical energy is in fact an active-control system, it has the usual drawbacks of such a device, namely, low reliability, low robustness, high complexity and expensive structure. Moreover, if an accidental failure of the controller takes place, the vehicle suspension can be rendered unstable by a negative damping force.

On the other hand, all the systems based on the ion separation effect suggested by the Patent Reference 13 to convert the mechanical energy into electrical energy suffer from the same major drawback, namely, only a quite low generated voltage (on order of mV) can be harvested. As a result, systems employing the ion separation effect cannot be actually used in practical applications.

SUMMARY OF THE INVENTION

Based on the above-mentioned background art, the inventor suggests a colloidal damper able to accommodate practical applications. The concrete objective of the present invention is to propose a colloidal damper able to convert a part of the externally exerted mechanical energy into electrical energy.

The colloidal damper in accordance with the present invention includes a cylinder, a piston guided and supported by the cylinder during its reciprocating movement inside the cylinder, and defining a closed space in association with the cylinder, a porous body having a large number of pores and being housed in the closed space, a working liquid with a high surface tension contained in the closed space together with the porous body, the working liquid being comprised of water, a mixture of water and antifreeze agent, a mixture of water and a material with higher vaporization point than water, or a mixture of water and antifoaming agent, and a piezoelectric device installed in the closed space, the working liquid flowing into the pores of the porous body against the surface tension of the working liquid when the working liquid is pressurized by the piston in association with the cylinder, and flowing out from the pores of the porous body under the action of the surface tension of the working liquid when the working liquid is depressurized.

In the case of the colloidal damper in accordance with the present invention, since the working liquid contained in the closed space flows-into the pores of the porous body, a part of the externally exerted mechanical energy can be dissipated, namely, damped or attenuated. Additionally, since during pressurization of the working liquid, the piezoelectric device is also pressurized, via the working liquid contained in the closed space, electrical energy can be harvested through the piezoelectric device.

It is preferable that the colloidal damper in accordance with the present invention additionally includes a filter which allows the working liquid to pass through, but does not allow the porous body to pass through, and divides the closed space into a first closed space on the side where the piston executes its reciprocating movement, and a second closed space other than (in the opposite side to) the first closed space, the piezoelectric device being installed inside the second closed space.

Since the filter allows the working liquid to pass through, but does not allow the porous body to pass through, it is possible to prevent the porous body from flowing into the gap where sliding friction occurs between the piston and the cylinder. In addition, since the piezoelectric device is installed inside the second closed space, located at the opposite side of the first closed space in which the piston executes its reciprocating movement, direct contact between the piezoelectric device and the piston is avoided.

It is preferable that during service the colloidal damper in accordance with the present invention is operated at a working pressure varying in the range of 20 to 60 MPa.

It is preferable that during service the colloidal damper in accordance with the present invention is operated at an internal spring constant varying in the range of 40 to 57 N/mm.

It is preferable that during service the colloidal damper in accordance with the present invention further includes a pressure controlling device used to control the pressure of the working liquid.

The advantages provided by the present invention are described hereinbelow.

(1) Colloidal damper in accordance with the present invention includes a cylinder, a piston guided and supported by the cylinder during its reciprocating movement inside the cylinder, and defining a closed space in association with the cylinder, a porous body having a large number of pores and being housed in the closed space, a working liquid contained in the closed space together with the porous body, the working liquid flowing into the pores of the porous body during pressurization, and flowing out from the pores of the porous body during depressurization, and a piezoelectric device installed in the closed space. Since during pressurization the piezoelectric device is also pressurized by the high-pressure of the working liquid contained in the closed space, it is possible to harvest electrical energy at a rate high enough to accommodate practical applications.

(2) Colloidal damper may be designed to additionally include a filter which allows the working liquid to pass through, but does not allow the porous body to pass through, and divides the closed space into a first closed space on the side where the piston executes its reciprocating movement, and a second closed space other than (in the opposite side of) the first closed space, the piezoelectric device being installed inside the second closed space. Since, the piezoelectric device can be installed inside the second closed space, located at the opposite side of the first closed space in which the piston executes its reciprocating movement, direct contact between the piezoelectric device and the piston is avoided, and consequently, the piezoelectric device is not to be damaged by the piston during its reciprocating movement.

The above-mentioned advantages, as well as additional advantageous features of the present invention will be illustrated by making reference to the accompanying drawings during the following description. Employed reference numerals designate the same or similar parts throughout the drawings.

BRIEF DESCRIPTION OF THE DRAWINGS

FIG. 2A illustrates a piezoelectric device able to generate electrical power when compressed by an axial pressure on the end flat surfaces of its tubular body.

DESCRIPTION OF THE PREFERRED EMBODIMENTS

Figure 1:
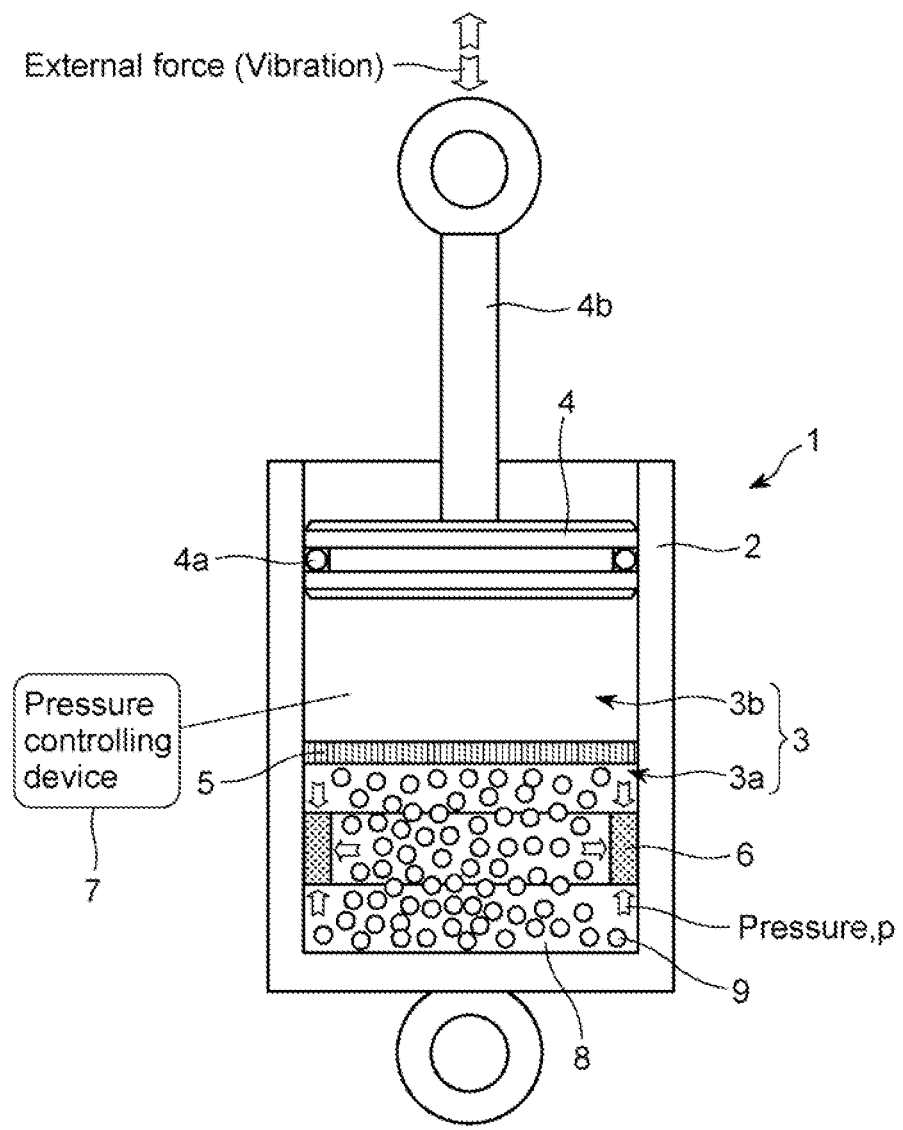
FIG. 1 illustrates a schematic view of the colloidal damper in accordance with one exemplary embodiment of the present invention.

FIG. 1 illustrates a schematic view of the colloidal damper in accordance with one exemplary embodiment of the present invention.

As illustrated in FIG. 1, the colloidal damper 1 in accordance with one exemplary embodiment of the present invention includes a cylinder 2, a piston 4 guided and supported by the cylinder 2 during its reciprocating movement inside the cylinder 2, and defining a closed space 3 in association with the cylinder 2, a filter 5 acting as a partition wall to divide the closed space 3 into a closed space 3a of constant volume and a closed space 3b of variable volume, and a piezoelectric device 6 installed inside the closed space 3a. A sealing device 4a consisted of a packing, etc. is provided at the gap where sliding friction occurs between the piston 4 and the inner wall of the cylinder 2.

The closed space 3 contains the working liquid 8. The porous bodies 9, each having a large number of pores, are housed in the closed space 3a of constant volume, which is located in the opposite side of the closed space 3b of variable volume in which the piston 4 executes its reciprocating movement. The filter 5 has a large number of pores, each pore having a diameter (ranging from about 0.1 micrometers to about 10 micrometers) smaller than the average outer diameter "$d_2$" of the porous bodies 9 (the average outer diameter is calculated based on the actually measured distribution of the outer diameters of the porous bodies 9). Thus, filter 5 allows the working liquid 8 to pass through, but does not allow the porous bodies 9 to pass through. In this way, the pores of the filter 5 isolate the porous bodies 9 from flowing into the gap where sliding friction occurs between the piston 4 and the inner wall of the cylinder 2. Thus, only the working liquid 8 is allowed to freely flow between the closed spaces 3a and 3b.

Each of the porous bodies 9 can be regarded as a micro-grain, namely, a substantially quasi-spherical particle with an outer diameter varying in the range of about 1 micrometer to about 100 micrometers. For example, porous body 9 is composed of silica gel, aero gel, ceramics, porous glass, zeolite, porous PTFE (polytetrafluoroethylene), porous wax, porous polystyrene, alumina or carbon (including graphite, charcoal, fullerene, and carbon nano-tubes). Each of the porous bodies 9 has a large number of nano-size pores (nano-pores), each nano-pore having an inner diameter varying in the range of about 1 nanometer to about 100 nanometers, and a cavity (hollow portion) formed almost in the vicinity of the center of the porous body 9. Each of the pores extends almost radially from the cavity towards the outer surface of the porous body 9, and it is opened at one end on the inner surface of the cavity and it is also opened at the other end on the outer surface of the porous body 9. In another embodiment, a porous body 9 without cavity may be used. The outer surface of each of the porous bodies 9, the inner surfaces of each of the pores, and the inner surface of each of the cavities are coated with a material consisted of linear molecular chains which have no affinity for the working liquid 8 (lyophobic treatment).

Working liquid 8 is preferably a liquid with high surface tension. Water is a typical example of suitable working liquid 8. Except water, mixtures of water and antifreeze agents may be used. For instance, water may be mixed with at least one antifreeze agent such as ethanol, ethylene glycol, propylene glycol and glycerin at a concentration preferably up to 67 volume %, in which case, it would be possible to use the colloidal damper 1 even at 0 degree centigrade or lower temperatures. As an alternative, water may be mixed with a material having a higher vaporization point higher than water, such as dimethyl-formamide and/or formamide, in which case, it would be possible to use the colloidal damper 1 even at 100 degree centigrade or higher temperatures.

As another alternative, a mixture of water and antifoaming agent may be used. For instance, water may be mixed with at least one antifoaming agent, such as silicon-based antifoaming agents, non-silicon antifoaming agents, and oily antifoaming agents at a concentration preferably up to 50 ppm, in which case, it would be possible to use the colloidal damper 1 even if air flows into the closed space 3 through the sealing device 4*a*. It is preferable that the average inner diameter "$d_1$" of the pores of the porous bodies 9 (the average inner diameter is calculated based on the actually measured distribution of the inner diameters of the pores of the porous bodies 9) is selected to satisfy the condition that the Knudsen number "Kn", defined as "$Kn=Lp/(d_1\times\frac{1}{2})$", is larger than 0.034, but smaller than 0.119 (preferably 0.097), wherein "Lp" represents the mean free path of molecules of the working liquid. It is also preferable that the average outer diameter "$d_2$" of the porous bodies 9 is selected to satisfy the condition that "$d_2$" is in the range of "$10\times d_1$" to "$100{,}000\times d_1$" both inclusive.

Concerning the volume ratio of the porous bodies 9 relative to the working liquid 8, it is preferable that the ratio "$MV_P/V_L$" to be in the range of 0.2 to 2.5 both inclusive, where "$MV_P$" (the product of the mass "M" of the porous bodies 9 and the specific volume "$V_P$" of the pores of the porous bodies 9) represents the total volume of the pores of the porous bodies 9, and "$V_L$" represents the volume of the working liquid 8. In this exemplary embodiment, the closed space 3 is filled in such a way that the ratio "$MV_P/V_L$" becomes substantially equal to 1.

When an external force is applied on the piston 4 via the piston rod 4*b* of the colloidal damper 1 that employs the above-mentioned structure, namely, when the colloidal damper 1 is pressurized, the external force is transmitted through the piston 4 to the working liquid 8, and hence, the working liquid 8 is also pressurized. The working liquid 8, pressurized in the above-described way, is able to flow against the surface tension (capillary pressure) into the pores of the porous bodies 9 supplied in the closed space 3*a*. As a result, volume of the closed space 3 reduces during the movement of the piston 4. Since the mechanical energy of vibration and/or shock associated to such external force is consumed during the penetration of the working liquid 8 into the pores, the energy (work) associated to the movement of the piston 4 under the applied external force is dissipated.

On the other hand, when the applied external force is relieved from the piston 4 of the colloidal damper 1, namely, when the colloidal damper 1 is depressurized, the working liquid 8, previously forced to flow against the surface tension into the pores, is able to flow-out from the pores of the porous bodies 9 due to the action of the surface tension. Now, volume of the closed space 3 increases during the movement in opposite direction of the piston 4, and in the end, piston 4 returns back to its initial position. During the reciprocating movement of the piston 4, the porous bodies 9 do not pass through the pores of the filter 5, but are kept inside the closed space 3*a*. Thus, only the working liquid 8 is able to freely pass through the pores of the filter 5. Accordingly, since the porous bodies 9 do not flow into the closed space 3*b* of the colloidal damper 1, it is possible to prevent the porous bodies 9 from entering into the gap where sliding friction occurs between the piston 4 and the inner wall of the cylinder 2. In this way, enhancement of the durability of the colloidal damper 1 is achieved.

Furthermore, harvesting of electrical energy becomes possible by using the colloidal damper in accordance with this exemplary embodiment of the present invention. Since the piezoelectric device 6 placed inside the closed space 3 is also pressurized when the working liquid 8 is pressurized, a part of the mechanical energy associated to the pressure exerted on the piezoelectric device 6 can be converted into electrical energy. The piezoelectric device 6 is a passive device employing the piezoelectric effect, namely, the ability of piezoelectric material to convert an applied pressure into a voltage. Thus, when the working liquid 8 contained in the closed space 3 is pressurized, pressure produced by the working liquid 8 on the piezoelectric device 6 is converted into a voltage.

Figure 2B:
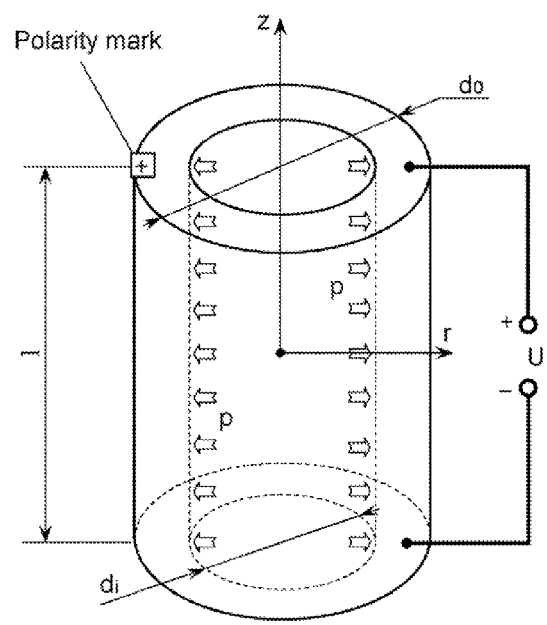
FIG. 2B illustrates a piezoelectric device able to generate electrical power when pressurized by a radial pressure on the inner cylindrical surface of its tubular body.

Concerning the piezoelectric device 6, a piezoelectric device able to generate electrical power when compressed by an axial pressure on the end flat surfaces of its tubular body, as illustrated in FIG. 2A, or a piezoelectric device able to generate electrical power when pressurized by a radial pressure on the inner cylindrical surface of its tubular body, as illustrated in FIG. 2B, may be used. Shape characteristics (shape and volume), performances regarding the electrical power generation (generated voltage, range of the piezoelectric constants, generated electrical power, and relative dielectric constant), as well as design conditions to achieve sufficient strength for the piezoelectric device 6 are illustrated in Table 1. Generated voltage "U" represents the voltage actually obtained by using the colloidal damper 1 in accordance with the present invention.

TABLE 1

|  |  | A | B |
|---|---|---|---|
| $l > 3d_o$ | $d_i = 0$ | Bar of circular cross-section | Bar of circular cross-section |
|  | $0 < d_i < d_o$ | Bar of annular cross-section | Bar of annular cross-section |
| $l < 0.2d_o$ | $d_i = 0$ | Circular disk | Circular disk |
|  | $0 < d_i < d_o$ | Annular disk | Annular disk |
| C |  | $V = \frac{\pi}{4}(d_o^2 - d_i^2)l$ | $V = \frac{\pi}{4}(d_o^2 - d_i^2)l$ |
| D |  | $U = g_{zz}lp$ | $U = g_{zr}lp\dfrac{1}{1 - d_i/d_o}$ |
| E |  | $12.2 \leq g_{zz} \leq 26.1$ | $4.7 \leq g_{zr} \leq 11.9$ |

TABLE 1-continued

| | A | B |
|---|---|---|
| F | $P = 0.5\varepsilon_0 g_{zz}^2 K_z n V p^2 f$ | $P = 0.5\varepsilon_0 g_{zr}^2 K_z n V p^2 f \dfrac{1}{(1-d_i/d_o)^2}$ |
| G | $625 \leq K_z \leq 3200$ | $625 \leq K_z \leq 3200$ |
| H | $p_{max} \leq \sigma_a$ | $\dfrac{1}{3} \leq \dfrac{d_i}{d_o} \leq \sqrt{\dfrac{\sigma_a - p_{max}}{\sigma_a + p_{max}}}$ |

A: Piezoelectric device able to generate electrical power when compressed by an axial pressure on the end flat surfaces of its tubular body
B: Piezoelectric device able to generate electrical power when pressurized by a radial pressure on the inner cylindrical surface of its tubular body
C: Volume of the piezoelectric device [m³]
D: Generated voltage [V]
E: Variation range of the piezoelectric constant [mV × m/N]
F: Generated electrical power [W]
G: Relative dielectric constant [—]
H: Design conditions to achieve sufficient strength for the piezoelectric device
(Static tensile strength: 52-83 MPa)
(Dynamic tensile strength: 21-48 MPa)

Shape of the piezoelectric device, electrical direction (direction of polarization) of the piezoelectric device, and mechanical direction (direction of the pressure) of the piezoelectric device are not to be limited to those illustrated in FIG. 2. For instance, shape of the piezoelectric device is not to be limited to an annular cylinder (tube), as illustrated in FIG. 2, namely, to a bar of circular cross-section, a bar of annular cross-section, a circular disk or an annular disk, as shown in Table 1. Thus, the piezoelectric device to be used in association with the colloidal damper 1 may have various shapes, such as a hollow sphere, a hemisphere, a rectangular plate, etc. Polarization direction is not restricted to the axial direction of the piezoelectric device (see the polarity mark on FIG. 2). Alternatively, the piezoelectric device may be polarized, for instance, along its radial direction. Additionally, in order to harvest electrical energy, the structure of the colloidal damper 1 can be appropriately altered in such a way that the working liquid 8 (colloidal solution) produces extension, bending, torsion, and/or shearing instead of pressurization on the piezoelectric device.

Figure 3:
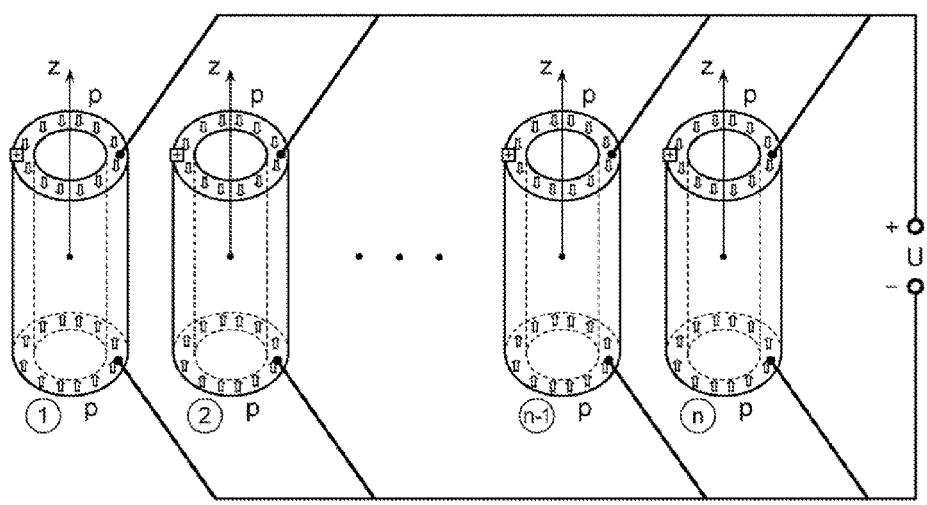
FIG. 3 illustrates a circuit diagram of "n" piezoelectric devices electrically connected in parallel to each other and able to generate electrical power when compressed by an axial pressure on the end flat surfaces of their tubular bodies.
Figure 4:
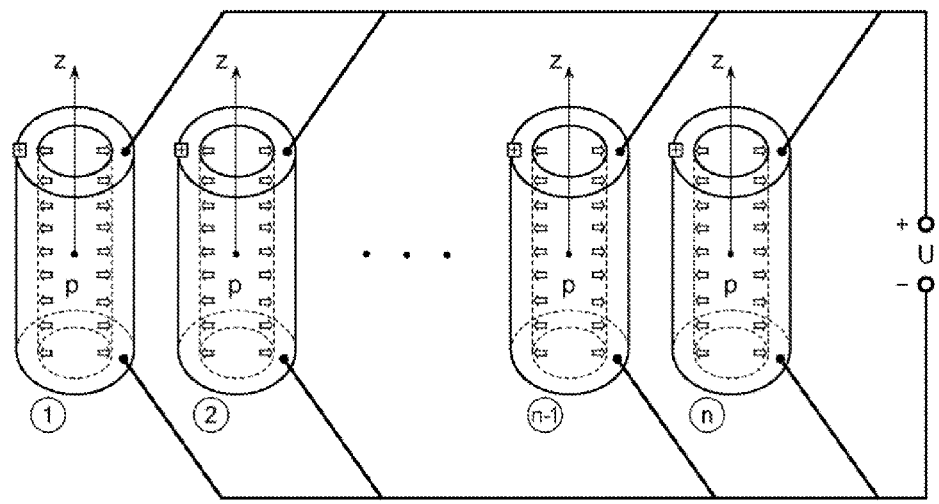
FIG. 4 illustrates a circuit diagram of "n" piezoelectric devices electrically connected in parallel to each other and able to generate electrical power when pressurized by a radial pressure on the inner cylindrical surfaces of their tubular bodies.

In order to increase the electrical power generation effect, it is also possible to use a plurality of piezoelectric devices 6 electrically connected in a parallel circuit. Thus, FIG. 3 illustrates a circuit diagram of "n" piezoelectric devices electrically connected in parallel to each other and able to generate electrical power when compressed by an axial pressure on the end flat surfaces of their tubular bodies, and FIG. 4 illustrates a circuit diagram of "n" piezoelectric devices electrically connected in parallel to each other and able to generate electrical power when pressurized by a radial pressure on the inner cylindrical surfaces of their tubular bodies. As alternatively illustrated in FIG. 5, the circuit may be consisted of "n" piezoelectric devices electrically connected in parallel to each other and able to generate electrical power when compressed by an axial pressure on the end flat surfaces of their tubular bodies, and simultaneously pressurized by a radial pressure on the inner cylindrical surfaces of their tubular bodies. By pressurizing the piezoelectric devices along two (axial and radial) directions, the total electrical power generated by the colloidal damper 1 can be further increased, since the electrical power generated due to the action of the axial pressure adds over the electrical power generated due to the action of the radial pressure.

Figure 5:
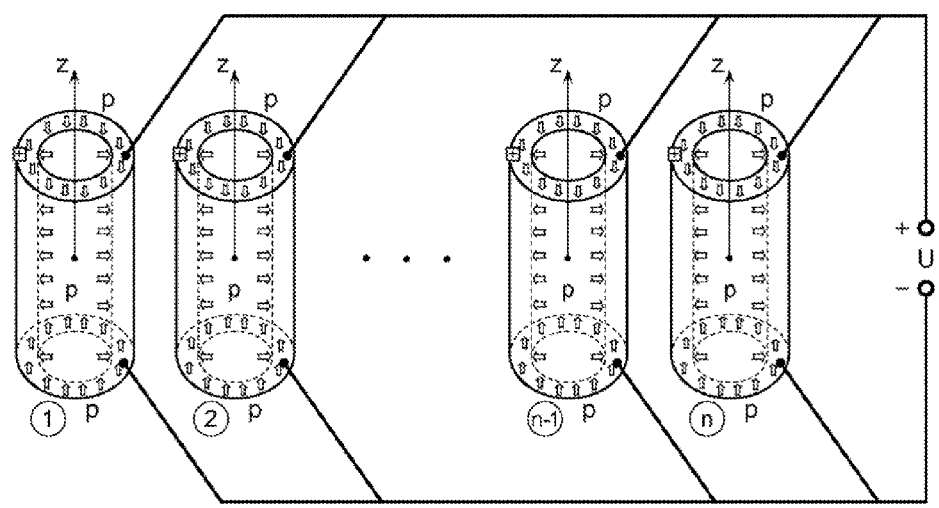
FIG. 5 illustrates a circuit diagram of "n" piezoelectric devices electrically connected in parallel to each other and able to generate electrical power when compressed by an axial pressure on the end flat surfaces of their tubular bodies, and simultaneously pressurized by a radial pressure on the inner cylindrical surfaces of their tubular bodies.

Hereinbelow, one verifies the ability of the colloidal damper 1 to generate electrical power based on the circuit illustrated in FIG. 5, consisted of "n" piezoelectric devices electrically connected in parallel to each other and able to generate electrical power when compressed by an axial pressure on the end flat surfaces of their tubular bodies, and simultaneously pressurized by a radial pressure on the inner cylindrical surfaces of their tubular bodies. Electrical power "P" generated by the colloidal damper 1 that employs the circuit illustrated in FIG. 5, consisted of "n" piezoelectric devices electrically connected in parallel, can be expressed by the following equation (1).

$$P = 0.5\varepsilon_0 K_z n V p^2 f \left[ g_{zz}^2 + \dfrac{g_{zr}^2}{(1-d_i/d_o)^2} \right] \quad (1)$$

From a practical standpoint, in order to efficiently harvest electrical energy by using the colloidal damper 1, one should fulfill the following design condition. Thus, the voltage generated due to the action of the axial pressure (see Table 1):

$$U = lp g_{zz}$$

should be equal to the voltage generated due to the action of the radial pressure (see Table 1):

$$U = lp g_{zr}/(1-d_i/d_o)$$

Under the above-mentioned design condition, by selecting a certain material for the piezoelectric devices, the piezoelectric constants ($g_{zz}$, $g_{zr}$) of the generated voltages can be decidedly identified, and consequently, the ratio $d_i/d_o$ of the inner diameter relative to the outer diameter of the piezoelectric device can be calculated by using the following equation (2).

$$\dfrac{d_i}{d_o} = 1 - \dfrac{g_{zr}}{g_{zz}} \quad (2)$$

For instance, supposing that the material selected for the piezoelectric device is a ceramic material with values for the piezoelectric constants $g_{zz}$ and $g_{zr}$ of the generated voltages equal to 26.1 mV×m/N and 11.9 mV×m/N, respectively, a value of 0.544 is obtained for the ratio $d_i/d_o$ of the inner diameter relative to the outer diameter of the piezoelectric device.

Actually, for a piezoelectric device pressurized along two (axial and radial) directions, under condition that the voltage generated due to the action of the axial pressure equals the voltage generated due to the action of the radial pressure, a double amount of electrical power can be generated (see equation (3)).

$$P = \varepsilon_0 K_z g_{zz}^2 n V p^2 f \quad (3)$$

In the case of a four-wheel vehicle, although the internal pressures inside the colloidal dampers 1 attached to all four wheels are instantaneously different, for the sake of simplification, in this embodiment it is supposed that the internal pressure of the colloidal damper 1 for the left-front wheel, the internal pressure of the colloidal damper 1 for the left-rear wheel, the internal pressure of the colloidal damper 1 for the right-front wheel, and the internal pressure of the colloidal damper 1 for the right-rear wheel are all equal to each other. As a result, a four times larger amount of electrical power can be generated (see equation (4)).

$$P = 4\varepsilon_0 K_z g_{zz}^2 n V p^2 f \quad (4)$$

By substituting the relationship between the inner and the outer diameters of the piezoelectric device as given by equation (2) into the next equation that expresses the volume of a piezoelectric device (see Table 1):

$$V=\pi(d_o^2-d_i^2)l/4$$

and then, substituting the result obtained into equation (4), one finds the total electrical power generated by the colloidal damper 1 in accordance with the present embodiment, as expressed by the following equation (5).

$$P=\pi\in_0 K_z g_{zr}(2g_{zz}-g_{zr})nd_o^2 lp^2 f \quad (5)$$

In the present embodiment, the values of the various parameters used in equation (5) are taken as follows.

Number of piezoelectric devices: n=55,
Frequency: f=10 Hz,
Outer diameter of the piezoelectric device: $d_o$=60 mm (Note that according to equation (2), the calculated inner diameter "$d_i$" of the piezoelectric device is equal to 33 mm),
Relative dielectric constant of the piezoelectric device: $K_z$=3200,
Absolute dielectric constant: $\in_0$=8.85 pF/m.

Additionally, one considers the following values of the voltages to be generated in the present embodiment: U=12 V (usual voltage of a battery equipping an automobile propelled by an internal combustion engine), 24 V (usual voltage of a battery equipping a truck propelled by an internal combustion engine), 202 V (voltage of a hybrid battery equipping a hybrid vehicle "A"), and 288 V (voltage of a hybrid battery equipping a hybrid vehicle "B").

Figure 6A:
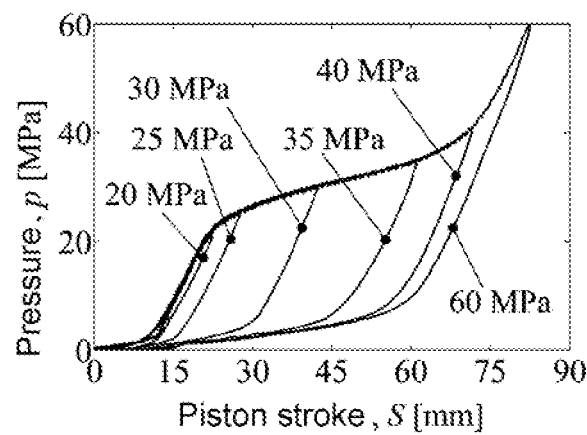
FIG. 6A illustrates the variation of the hysteresis loop when the maximum working pressure of the colloidal damper is changed.
Figure 6B:
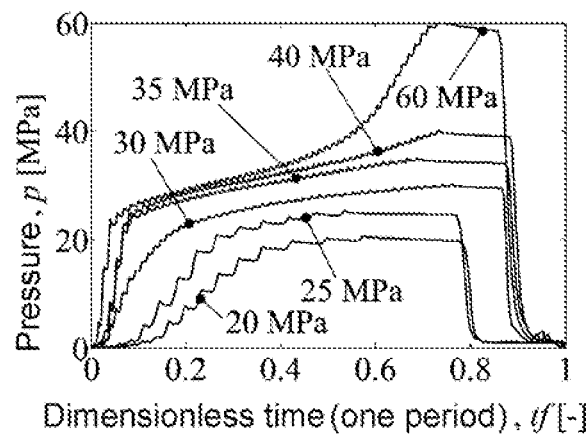
FIG. 6B illustrates the variation of the working pressure during one period when the maximum working pressure of the colloidal damper is changed.

FIG. 6A illustrates the variation of the hysteresis loop (loop-like relationship between the working pressure and the piston stroke) when the maximum working pressure of the colloidal damper 1 is set to 20 MPa, 25 MPa, 30 MPa, 35 MPa, 40 MPa and 60 MPa, and FIG. 6B illustrates the variation of the working pressure during one period when the maximum working pressure of the colloidal damper is set to 20 MPa, 25 MPa, 30 MPa, 35 MPa, 40 MPa and 60 MPa.

Figure 7A:
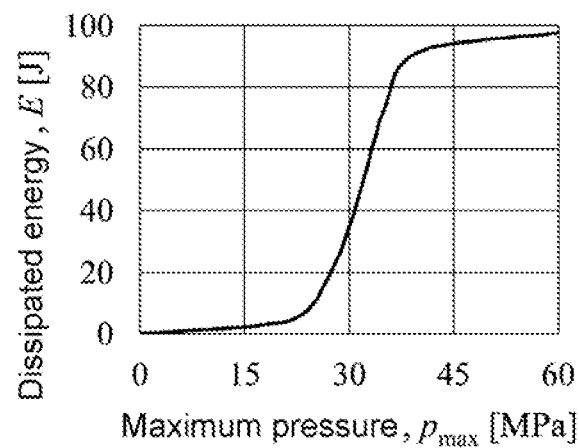
FIG. 7A illustrates the relationship between the maximum working pressure of the colloidal damper and the dissipated energy.

In the analysis of the dissipated energy "E" of the colloidal damper 1, the dissipated energy is calculated by multiplying the cross-sectional area of the piston 4 with the area of the hysteresis loop "p(S)" illustrated in FIG. 6A. Thus, FIG. 7A illustrates the relationship between the maximum working pressure and the dissipated energy of the colloidal damper 1. From FIG. 7A one observes that the dissipated energy of the colloidal damper 1 monotonically increases at the augmentation of the maximum working pressure.

Figure 7B:
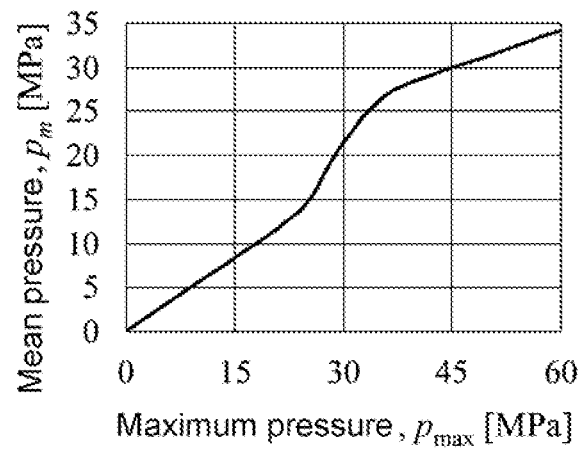
FIG. 7B illustrates the relationship between the maximum working pressure of the colloidal damper and the mean pressure.

Mean pressure "$p_m$" of the colloidal damper 1 represents the average value on the graph "p=p(tf)" illustrated by FIG. 6B, namely, the value obtained by integrating the working pressure versus the dimensionless time over one period. Thus, FIG. 7B illustrates the relationship between the maximum working pressure and the mean pressure of the colloidal damper 1. From FIG. 7B one observes that the mean pressure of the colloidal damper 1 monotonically increases at the augmentation of the maximum working pressure.

Figure 8A:
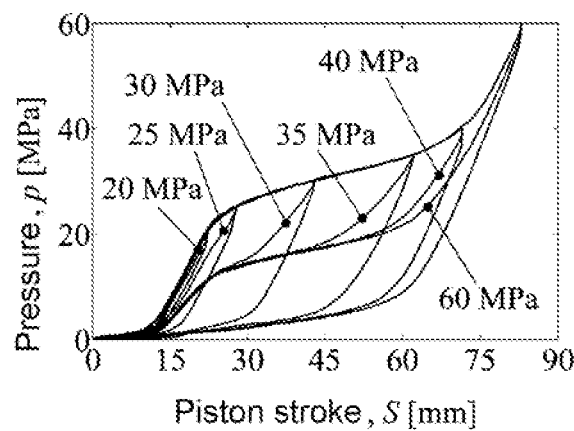
FIG. 8A illustrates the variation of the hysteresis loop and also the variation of the hysteresis central line when the maximum working pressure of the colloidal damper is changed.

FIG. 8A illustrates the variation of the hysteresis loop (loop-like relationship between the working pressure and the piston stroke) and also the variation of the hysteresis central line (graph showing variation of the mean pressure versus the piston stroke) when the maximum working pressure of the colloidal damper 1 is set to 20 MPa, 25 MPa, 30 MPa, 35 MPa, 40 MPa and 60 MPa. Accordingly, the internal spring constant $k_s$ of the colloidal damper 1 is calculated by multiplying the cross-sectional area of the piston 4 by the slope of the central line of the hysteresis as illustrated in FIG. 8A.

Figure 8B:
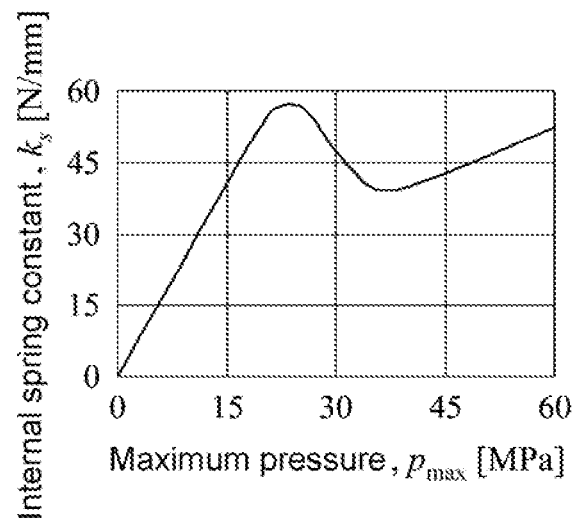
FIG. 8B illustrates the relationship between the maximum working pressure of the colloidal damper and its internal spring constant.

FIG. 8B illustrates the relationship between the maximum working pressure and the internal spring constant of the colloidal damper 1. From FIG. 8B one observes that the internal spring constant linearly increases at the augmentation of the maximum working pressure both in the regions of low and high values of the maximum working pressure. This can be explained by the fact that the working liquid 8 does not flow-into and flow-out from the pores of the porous bodies 9 in these regions, and consequently, only the compressibility of the working liquid and the elasticity of the sealing device are responsible for the observed variation of the internal spring constant in these regions. Additionally, one observes that when the maximum working pressure varies in the range of 15 to 45 MPa, since the working liquid 8 flows-into and flows-out (absorption and desorption) from the pores of the porous bodies 9, the stiffness of the colloidal damper 1 decreases, namely, the internal spring constant decreases.

For a given maximum working pressure the mean pressure can be calculated based on FIG. 7B, which provides the relationship between the mean pressure and the maximum working pressure of the colloidal damper 1. Then, by substituting the calculated mean pressure, the piezoelectric constant of the generated voltage $g_{zz}$=26.1 mV×m/N, and the length (thickness) of the piezoelectric device l=0.1, 0.7 and 1.0 mm into the equation of the generated voltage (see Table 1):

$$U=lpg_{zz}$$

the mean value $U_m$ of the generated voltage can be calculated for various values of the thickness of the piezoelectric device. Thus, FIG. 9A illustrates the resulting relationship between the mean generated voltage and the maximum working pressure of the colloidal damper 1 for various values of the thickness of the piezoelectric device.

Next, the mean value $P_m$ of the generated electrical power can be calculated by substituting into equation (5) the following values of the various parameters:

Mean pressure from FIG. 7B,
Number of piezoelectric devices: n=55,
Frequency: f=10 Hz,
Outer diameter of the piezoelectric device: $d_o$=60 mm,
Piezoelectric constants of the generated voltage: $g_{zz}$=26.1 mV×m/N and $g_{zr}$=11.9 mV×m/N,
Relative dielectric constant of the piezoelectric device: $K_z$=3200,
Absolute dielectric constant: $\in_0$=8.85 pF/m, and
Length (thickness) of the piezoelectric device: l=0.1, 0.7 and 1.0 mm. Thus, FIG. 9B illustrates the resulting relationship between the mean generated electrical power and the maximum working pressure of the colloidal damper 1 for various values of the thickness of the piezoelectric device.

Figure 9A:
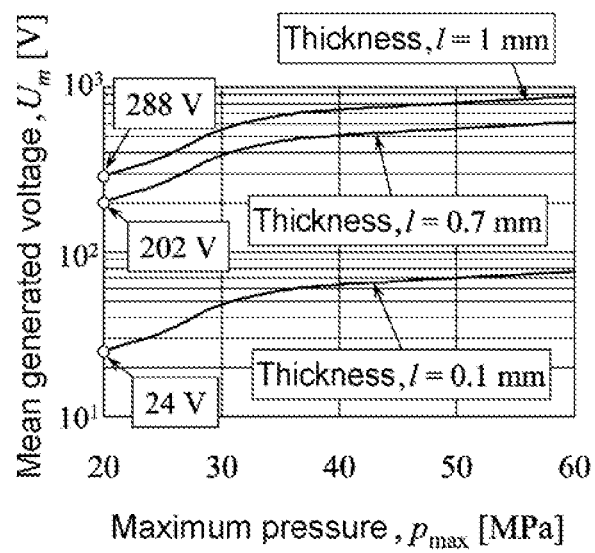
FIG. 9A illustrates the relationship between the maximum working pressure of the colloidal damper and the mean generated voltage.

From FIG. 9A, one observes that in order to achieve a mean generated voltage of $U_m$=12 V (usual voltage of a battery equipping an automobile propelled by an internal combustion engine), the necessary thickness of the piezoelectric device is too small, and consequently, the colloidal damper 1 in accordance with the present invention is unlikely to be used in practical applications. However, in order to achieve a mean generated voltage of $U_m$=24 V (usual voltage of a battery equipping a truck propelled by an internal combustion engine), a mean generated voltage of $U_m$=202 V (voltage of a hybrid battery equipping a hybrid vehicle "A"), and a mean generated voltage of $U_m$=288 V (voltage of a hybrid battery equipping a hybrid vehicle "B"), the necessary thickness of the piezoelectric device (l=0.1, 0.7 or 1.0 mm) can be technologically obtained in a relatively easy manner. Consequently, the colloidal damper 1 in accordance with the present invention is likely to be used in such practical applications.

Figure 9B:
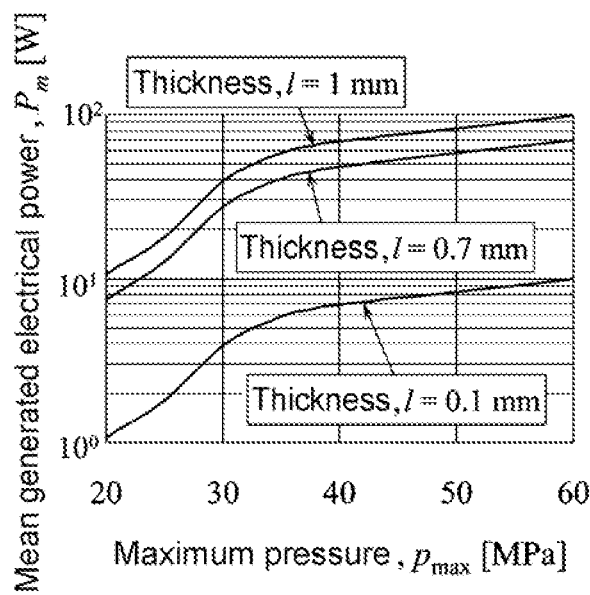
FIG. 9B illustrates the relationship between the maximum working pressure of the colloidal damper and the mean generated electrical power.
Figure 10:
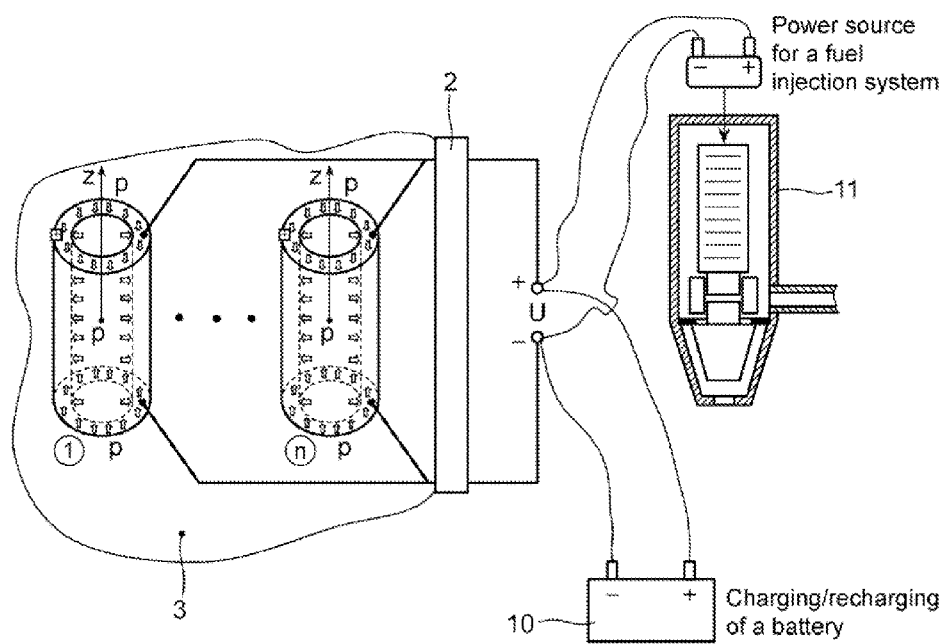
FIG. 10 illustrates a schematic view of the colloidal damper, as employed into an actual practical application.

Furthermore, from FIG. 9B, one observes that the mean electrical power generated by the colloidal damper 1 varies in the range of 1 to 100 W. Consequently, the colloidal damper 1 in accordance with the present invention is likely to be used in practical applications (for instance, as illustrated in FIG. 10, to charge/recharge a battery 10, or as electrical power source for the actuator 11 of a fuel injection system).

Figure 11:
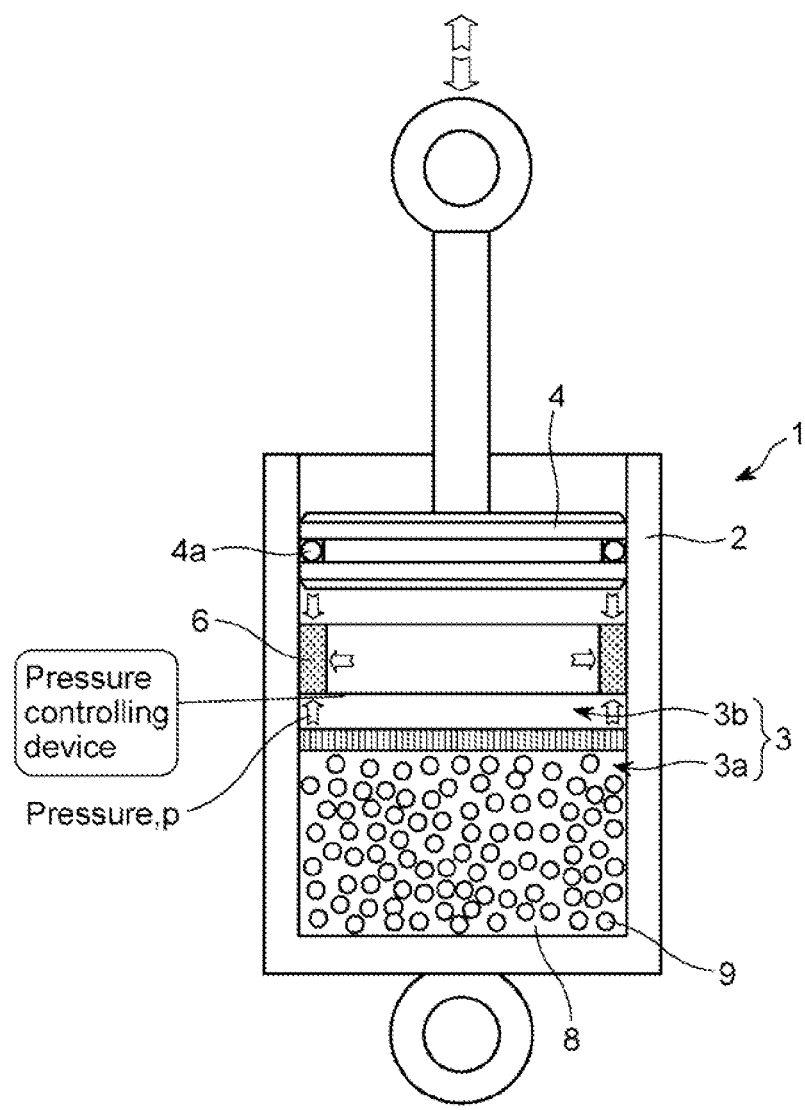
FIG. 11 illustrates a schematic view of the colloidal damper in accordance with another exemplary embodiment of the present invention.
Figure 12:
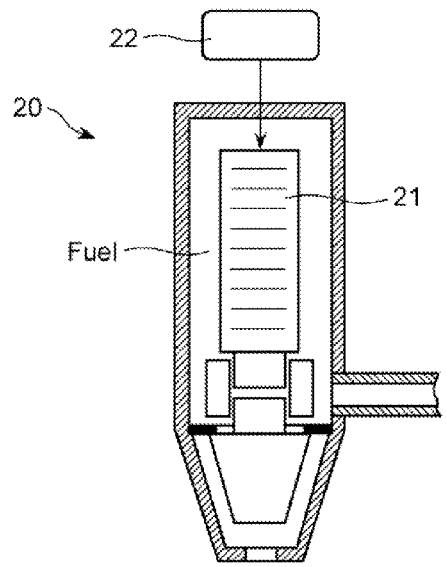
FIG. 12 illustrates a fuel injection system.
Figure 13:
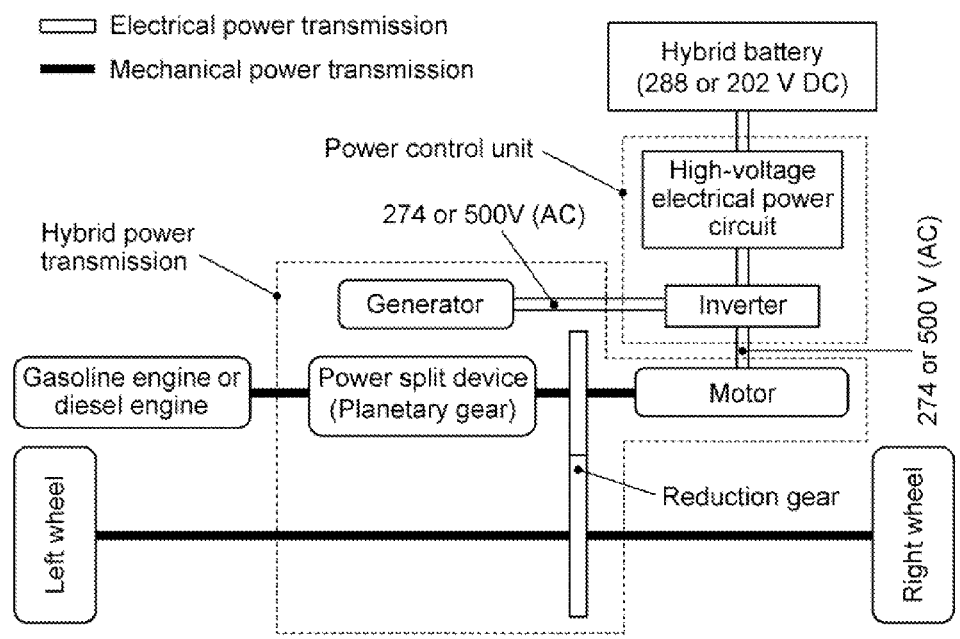
FIG. 13 illustrates an energetic flowchart of a hybrid vehicle.
Figure 14:
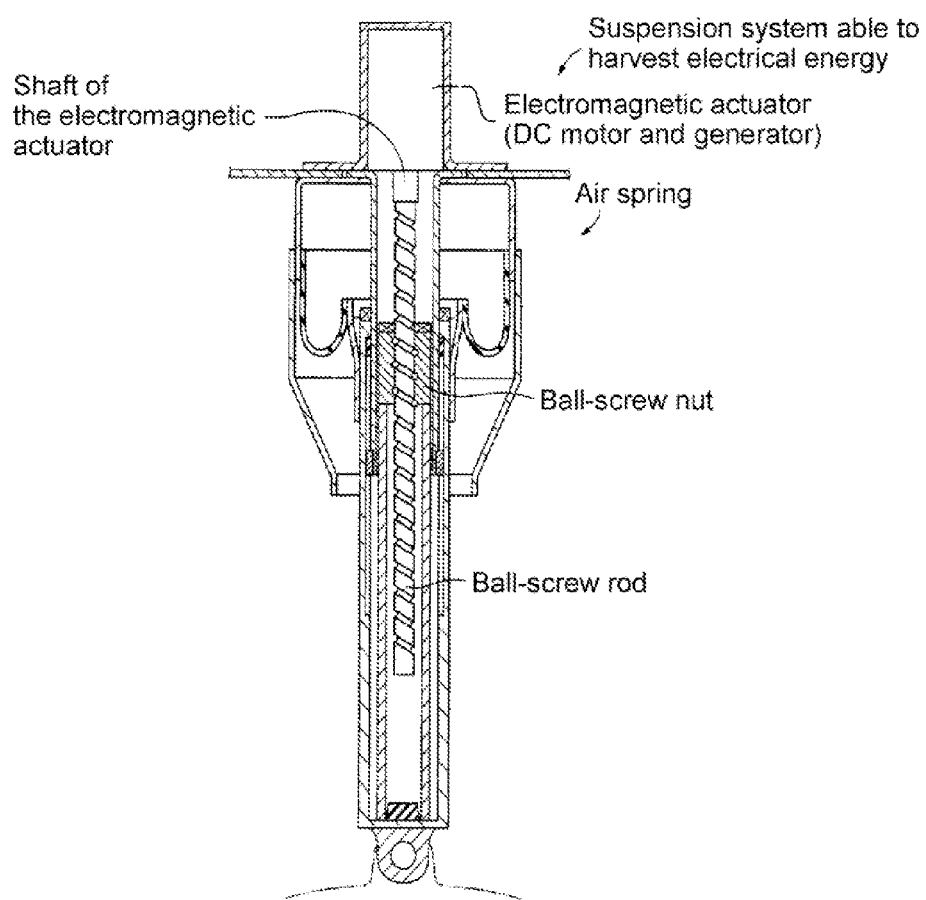
FIG. 14 illustrates a vehicle suspension using a structure consisted of an electromagnetic actuator mounted in parallel with an air spring.
Figure 15:
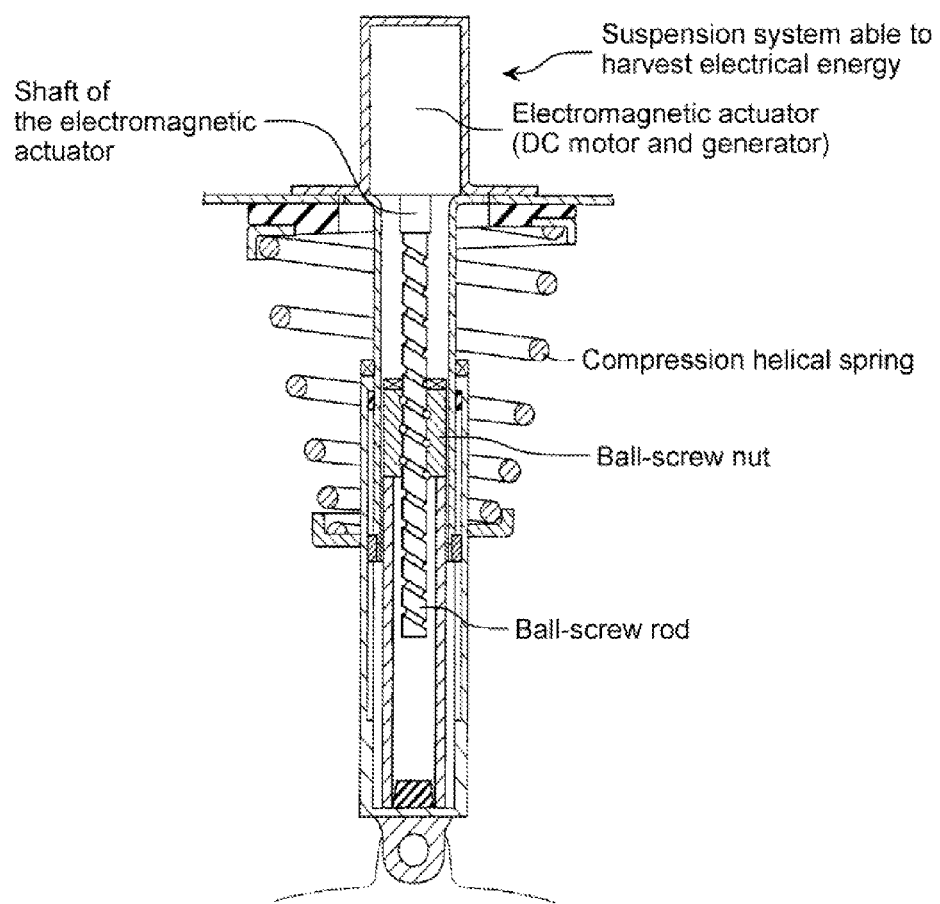
FIG. 15 illustrates a vehicle suspension using a structure consisted of an electromagnetic actuator mounted in parallel with a compression helical spring.

Although the piezoelectric device 6 is housed inside the closed space 3a of constant volume in the case of the colloidal damper 1 in accordance with the above-mentioned exemplary embodiment, the piezoelectric device 6 may be also housed inside the closed space 3b of variable volume, as illustrated in FIG. 11. Since the pressure "p" in the closed space 3b equals the pressure in the closed space 3a, the same advantages as those discussed for the above-mentioned exemplary embodiment can be obtained in this new arrangement with the piezoelectric device 6 housed inside the closed space 3b. However, the piezoelectric device 6 should be placed inside the closed space 3b in a region where contact with the piston 4 can be avoided.

As illustrated in FIG. 1, the colloidal damper 1 in accordance with the present exemplary embodiment includes a pressure controlling device 7 used to control the pressure within the closed space 3. For instance, the pressure controlling device 7 may be comprised of a pumping device in communication with the closed space 3, and such pumping device is used to force the working liquid 8 to flow-into the closed space 3 and to flow-out from the closed space 3. The pumping device is comprised of a pump, a servo valve, a pressure gauge, an accelerometer, as well as a controller, and it is able to control the volume and/or the pressure of the working liquid 8 which flows into and flows out from the closed space 3. Since the pressure controlling device 7 is able to control the pressure in the closed space 3 defined in association with the cylinder 2 and the piston 4, it becomes possible to actively control the damping and the elastic characteristics of the colloidal damper 1.

As an alternative, the pressure controlling device 7 may be comprised of an oscillator used to apply elastic waves to the porous bodies 9, to the working liquid 8, or to the cylinder 2. Excited elastic waves can be, for example, acoustic waves and/or ultrasonic waves. Thus, the above-mentioned pumping device can be replaced by an oscillator, namely, by an elastic wave generator to produce, for instance, acoustic waves and/or ultrasonic waves, and in this way, it becomes possible to actively control the damping and the elastic characteristics of the colloidal damper 1.

As an alternative, the pressure controlling device 7 may be comprised of a surface-tension controlling device used to control the surface tension of at least one of the porous bodies 9 and the working liquid 8. The surface-tension controlling device may be comprised of an electric-field controlling device used to control the electric field inside the closed space 3, or a magnetic-field controlling device used to control the magnetic field inside the closed space 3. As an alternative, the surface-tension controlling device may be comprised of a temperature controlling device used to control the temperature of at least one of the porous bodies 9 and the working liquid 8 in the closed space 3. As an alternative, the surface-tension controlling device may be comprised of an electrochemical controlling device used to control the reversible oxidation-reduction characteristic of a surfactant mixed into the working liquid 8. As an alternative, the surface-tension controlling device may be comprised of an irradiating device used to control the reversible photoisomerization characteristic of a surfactant mixed into the working liquid 8, by irradiating the surfactant with light or ultraviolet rays.

As an alternative, the pressure controlling device 7 may be comprised of a diameter controlling device used to control the inner diameter of the pores of the porous bodies 9. For instance, the diameter controlling device may be designed to rotate, extend or contract the molecules of the hydrophobic coating, through which the porous bodies 9 are treated to become hydrophobic. Thus, an irradiating device able to irradiate light or ultraviolet rays may be employed to rotate, extend or contract the molecules of the hydrophobic coating. As an alternative, the pressure controlling device 7 may be comprised of a mass controlling device used to control the mass of at least one of the porous bodies 9 and the working liquid 8.

INDUSTRIAL APPLICABILITY

The colloidal damper in accordance with the present invention can be used as a damper and harvester able to convert the externally exerted mechanical energy into electrical energy. Accordingly, colloidal damper in accordance with the present invention can be used to charge/recharge a battery, and also as an electrical power source for the actuator of a fuel injection system.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2011-085608 filed on Apr. 7, 2011 including specification, claims, drawings and summary is incorporated herein by reference in its entirety.

The invention claimed is:

1. A colloidal damper comprising:
a cylinder;
a piston guided and supported by the cylinder during its reciprocating movement inside the cylinder, and defining a closed space in association with the cylinder;
a porous body having a large number of pores and being housed in the closed space;
a working liquid contained in the closed space together with the porous body;
a filter which allows the working liquid to pass through, but does not allow the porous body to pass through, and divides the closed space into a first closed space on the side where the piston executes its reciprocating movement, and a second closed space other than the first closed space; and
a piezoelectric device installed in the second closed space, the working liquid flowing into the pores of the porous body when the working liquid is pressurized by the piston in association with the cylinder, and flowing out from the pores of the porous body when the working liquid is depressurized,
the piezoelectric device being able to generate electrical power when compressed by an axial pressure and/or by a radial pressure,
the piezoelectric device having a diametral ratio $d_i/d_o$ as defined by the following equation:

$$\frac{d_i}{d_o} = 1 - \frac{g_{zr}}{g_{zz}}$$

wherein $d_i$ is an inner diameter of the piezoelectric device, $d_o$ is an outer diameter of the piezoelectric device, $g_{zz}$ is a piezoelectric constant of the voltage generated by the axial pressure, and $g_{zr}$ is a piezoelectric constant of the voltage generated by the radial pressure.

2. The colloidal damper as set forth in claim 1, wherein during service the colloidal damper is operated at a working pressure varying in the range of 20 to 60 MPa.

3. The colloidal damper as set forth in claim 1, wherein during service the colloidal damper is operated at an internal spring constant varying in the range of 40 to 57 N/mm.

4. The colloidal damper as set forth in claim 1, further comprising a pressure controlling device used to control the pressure of the working liquid.

5. The colloidal damper as set forth in claim 1, wherein the working liquid is comprised of water, a mixture of water and antifreeze agent, a mixture of water and a material with higher vaporization point than water, or a mixture of water and antifoaming agent.

* * * * *